(12) United States Patent  (10) Patent No.: US 7,104,159 B2
Plassiard et al.  (45) Date of Patent: Sep. 12, 2006

(54) BICYCLE PEDAL AND FASTENING SHOE ASSEMBLY AND PEDAL AND CLEAT FOR SAME

(75) Inventors: Alain Plassiard, La Murette (FR); Jean-Francois De Bast, Montferrat (FR)

(73) Assignee: Time Sport International, (FR)

( * ) Notice: Subject to any disclaimer, the term of this patent is extended or adjusted under 35 U.S.C. 154(b) by 0 days.

(21) Appl. No.: 11/145,972

(22) Filed: Jun. 7, 2005

(65) Prior Publication Data

US 2005/0223844 A1   Oct. 13, 2005

Related U.S. Application Data

(63) Continuation of application No. 10/472,898, filed on Sep. 25, 2003.

(30) Foreign Application Priority Data

Apr. 12, 2001   (FR)   .................................. 01 05009

(51) Int. Cl.
  *G05G 1/14*   (2006.01)
(52) U.S. Cl. ........................ 74/594.6; 36/131
(58) Field of Classification Search .... 74/594.4–594.7; 36/131
  See application file for complete search history.

(56) References Cited

U.S. PATENT DOCUMENTS

| 3,963,251 | A | * | 6/1976 | Miano ......................... 280/843 |
| 4,762,019 | A |   | 8/1988 | Beyl |
| 4,822,946 | A |   | 4/1989 | Fischer |
| 4,827,797 | A | * | 5/1989 | Le Faou et al. ............ 74/594.6 |
| 4,836,047 | A | * | 6/1989 | Alcamo ..................... 74/594.6 |
| 5,377,561 | A |   | 1/1995 | Danieli et al. |

(Continued)

FOREIGN PATENT DOCUMENTS

EP   0 169 080   1/1986

(Continued)

OTHER PUBLICATIONS

International Search Report No. PCT/FR02/01187, dated Aug. 26, 2002, 2 pages.

*Primary Examiner*—Chong H. Kim
(74) *Attorney, Agent, or Firm*—Connolly Bove Lodge & Hutz LLP

(57) ABSTRACT

The invention concerns a bicycle pedal and fastening shoe assembly (C), the pedal comprising a body rotatably mounted on an axle (3) and, at least on one side of the body a chain-wheel above the pedal axle; front abutting means (9) extending parallel to the geometrical axis (A) of the pedal at the rear of said axis designed to co-operate with a front abutting surface (26) of the shoe; a retaining member (10) mounted on the pedal, pressed by elastic return means against the rear of the shoe, and retaining means towards the top provided on the pedal to co-operate with a combined means of the shoe. The front abutting means (9) of the pedal and the front abutting surface (26) of the shoe are designed to slide against each other along a direction perpendicular to the chain-wheel of the pedal without catching, the rear retaining member (10) is designed to fasten a combined element (29) of the shoe, and the pedal body comprises, at the rear of the member (10) clearances to enable the use of staples (35a, 35b) preventing the shoe from being in direct contact with the ground when walking, and a support zone (15) for a shoe sole equipped with the shoe.

8 Claims, 4 Drawing Sheets

U.S. PATENT DOCUMENTS

| | | | |
|---|---|---|---|
| 5,417,128 A * | 5/1995 | Beyl | 74/594.6 |
| 5,606,894 A * | 3/1997 | Bryne | 74/594.6 |
| 5,727,429 A | 3/1998 | Ueda | |
| 5,845,421 A * | 12/1998 | Tanaka | 36/117.3 |
| 5,878,514 A | 3/1999 | Ueda et al. | |
| 5,924,220 A | 7/1999 | Ueda et al. | |
| 5,943,795 A | 8/1999 | Ueda et al. | |
| 6,244,136 B1 * | 6/2001 | Chen | 74/594.6 |
| 6,725,742 B1 * | 4/2004 | Bremer | 74/594.6 |

FOREIGN PATENT DOCUMENTS

| | | |
|---|---|---|
| EP | 0 531 873 | 3/1993 |
| EP | 0 826 588 | 3/1998 |
| FR | 2624469 A1 * | 6/1989 |
| FR | 2 644 130 | 9/1990 |

* cited by examiner

BICYCLE PEDAL AND FASTENING SHOE ASSEMBLY AND PEDAL AND CLEAT FOR SAME

This application is a continuation of U.S. patent application Ser. No. 10/472,898, filed Sep. 25, 2003.

The invention relates to a bicycle pedal assembly with a safety binding and cleat designed to be fixed under the sole of a shoe, this assembly being of the kind in which the pedal comprises a body mounted to rotate on a spindle and, on at least one face of the body:

a plateau above the spindle of the pedal;

a frontal stop means stretching parallel to the geometric axis of the pedal and situated to the rear of this axis, able to collaborate with a frontal stop surface of the cleat, with lateral freedom;

a holding means) mounted to move on the pedal, able to be applied by an elastic return means against the rear of the cleat, and an upward retaining means provided on the pedal to collaborate with a mating means on the cleat, it being possible for the cleat to be clipped into the pedal by foot pressure on the plateau of the pedal, while unclipping is obtained by twisting the foot relative to the pedal about a point situated behind the geometric axis of the pedal.

EP 0 169 080 discloses a bicycle pedal and cleat assembly of this kind, by virtue of which an effective connection is made between the pedal and the cycling shoe while at the same time guaranteeing good safety. If the cyclist should fall, automatic unclipping of the shoe may occur. In normal use, the cyclist can easily release his foot by a twisting movement unclipping the cleat. The center of rotation of the cleat and of the shoe, relative to the pedal, is situated behind the axis of rotation of the pedal against the frontal stop means of this pedal. The cyclist enjoys an angular freedom of the foot without the risk of unclipping or "releasing", the latter being obtained for a greater twisting movement. The extent of the frontal stop means in a direction parallel to the axis of the pedal also allows lateral freedom to be enjoyed.

Although the known assembly is satisfactory, it is desirable to facilitate the operation of clipping the cleat into the pedal.

It is in particular an object of the invention to provide an assembly that gives a solution to this problem while at the same time maintaining the advantages of the previous assembly.

As a preference, the invention aims to provide a fixing assembly which operates correctly even if the sole of the shoe is equipped with crampons which are taller than the height of the cleat so that when the cyclist walks, the sole bears on the ground via the crampons without the cleat touching the ground.

According to the invention, an assembly comprising a bicycle pedal with a safety binding and a cleat designed to be fixed under the sole of a shoe, of the kind defined above, is characterized in that:

the frontal stop means of the pedal and the frontal stop surface of the cleat are designed to be able to slide one over the other in a direction perpendicular to the plateau of the pedal without catching, particularly upward, the rear holding member constitutes the upward retaining means and is designed to catch on a mating element of the cleat, and the pedal body comprises, behind the rear holding member, a bearing region for the sole of a shoe equipped with the cleat.

As a preference, the pedal comprises, behind its geometric axis, and behind the plateau, a recess on each side.

The pedal body may comprise, behind the plateau an extending branch on each side, having a height shorter than that of the body, and the underside of which is roughly level with the lowermost part of the body, the branches converging toward the rear to meet and form the rear bearing region, the recesses being situated above the branches.

The rear bearing region may consist of a central block of maximum width less than the width of the pedal. This rear bearing region may be situated at the level of the plateau.

Advantageously, the cleat is secured at the upper part to a mounting plate equipped, toward the rear, on each side, with a crampon, particularly one made of plastic or elastomeric material, it being possible for each crampon to pass through the corresponding recess in the pedal body during the twisting movement for release. A stop member, projecting downward and forward, may be fixed under the mounting plate, at the front. As a preference, the two rear crampons and the front stop member are tall enough to form a three point contact on the ground and keep the cleat out of contact with the ground when a cyclist is walking in a shoe equipped with the cleat and mounting plate.

The rear holding member may consist of a piece with a dihedral-shaped cross section, the concave side of which faces forward and one face of which forms a hook, this piece being mounted to rotate on a rod parallel to the axis of the pedal and urged elastically to rotate forward.

As an alternative, the rear holding member comprises a strip mounted to rotate on a rod parallel to the axis of the pedal and urged elastically to rotate forward.

In general, the holding member has a straight front edge parallel to the axis of the pedal.

The mating element of the cleat, designed to collaborate with the holding member, may be formed of a backwardly protruding spur at the lower part of the cleat.

The frontal stop means of the pedal may comprise a wall perpendicular to the plateau and toward the front bounding a rear cut-out of the plateau. The wall may be formed of an attached plate made of a metal harder than that of the pedal body.

As an alternative, the frontal stop means of the pedal comprises a wire made of a metal harder than that of the pedal body, parallel to the axis of the pedal, set into the wall so that it is flush with this wall.

The invention also relates to a bicycle pedal with safety binding exhibiting the characteristics of the pedal of an assembly as defined above.

The invention also relates to a cleat having the characteristics of the cleat of an assembly as defined above.

In particular, a cleat according to the invention is characterized in that it is secured to a mounting plate equipped on each side toward the rear with a crampon for walking and, toward the front, with a downwardly and forwardly projecting stop member, the crampons and the stop member being tall enough to form a three point contact with the ground and keep the cleat off the ground when a cyclist is walking in a shoe equipped with this cleat.

Apart from the provisions explained hereinabove, the invention consists in a certain number of other provisions that will be dealt with more explicitly hereinafter with regard to some exemplary embodiments described in detail with reference to the drawings appended hereto, but which are not in any way limiting.

In these drawings:

FIG. 9 is a view in longitudinal section of an alternative form of embodiment of the pedal with the cleat clipped in.

Figure 10:
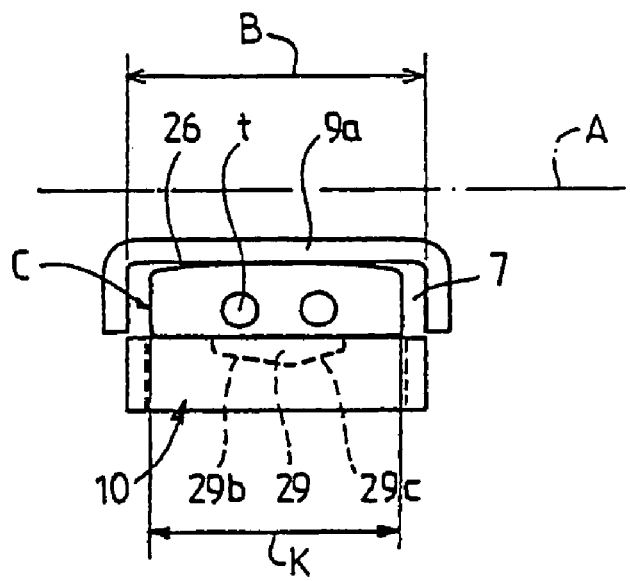
FIG. 10 is a schematic plan view illustrating the clipped-in position of the cleat and of a right pedal.
Figure 11:
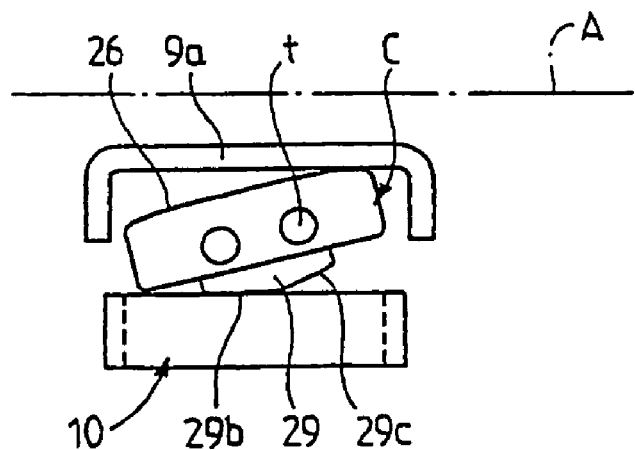

FIG. 11, finally, illustrates, in a way similar to FIG. 10, the unclipping by twisting of the cleat relative to the right pedal.

Reference is made to the drawings, in particular to FIGS. 1 to 6, which show a bicycle pedal 1 with safety binding comprising a pedal body 2 mounted to rotate on a spindle 3. The spindle 3 is engaged in a bore of the body 2 (see FIG. 6), and a rolling bearing 3a, for example a needle bearing, is mounted at its end. The pedal depicted in FIGS. 1 to 6 is a left pedal, to be fixed on a pedal crank on the right.

Throughout the text of the description and of the claims, the terms "front", "rear", "top", "underside", etc. are to be understood with reference to a pedal mounted on a bicycle pedal crank and occupying a roughly horizontal normal work position. "Front" corresponds to the direction of travel of the bicycle, "rear" corresponds to the opposite direction.

The pedal body 2 comprises a roughly flat plateau 4, above the spindle 3 of the pedal. The plateau 4 is bounded on the sides by an outer edge 4a and by an inner edge 4b, secured to a hub 5 in which a rolling bearing is mounted about the spindle 3. The front edge 4c of the plateau has a convex shape and is equipped in its central part with a rounded forward projection 6.

The rear edge of the plateau has a rectangular cut-out 7 whose dimension B parallel to the geometric axis A is greater than half the width L of the pedal (L is equal to the distance between the lateral edges 4a and 4b), and preferably at least equal to 2L/3. The cut-out 7 is bounded on each side by a rear lump 8a, 8b of the plateau, and is open to the rear.

Figure 7:
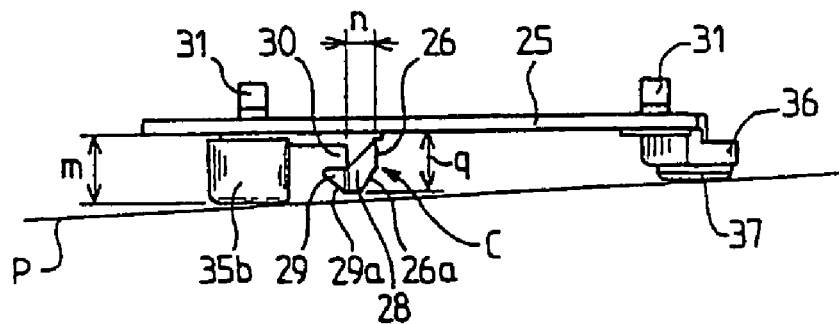
FIG. 7 is a side view of the cleat, of the mounting plate and of the front stop member.

The cut-out 7 is bounded at the front by a wall 9 roughly orthogonal to the upper plane of the plateau 4, running parallel to the spindle 3 of the pedal, behind this spindle. The wall 9 is situated below the upper surface of the plateau 4. At least one region of this wall 9 constitutes a frontal stop means for a cleat C (FIG. 7).

In general, the pedal body 4 is made of light alloy, for example an alloy based on aluminum and magnesium, or of a thermoplastic resin. The wall 9, exposed to friction and force, is advantageously made of an attached plate in a metal harder than that of the body 4, for example a steel plate.

Figure 9:
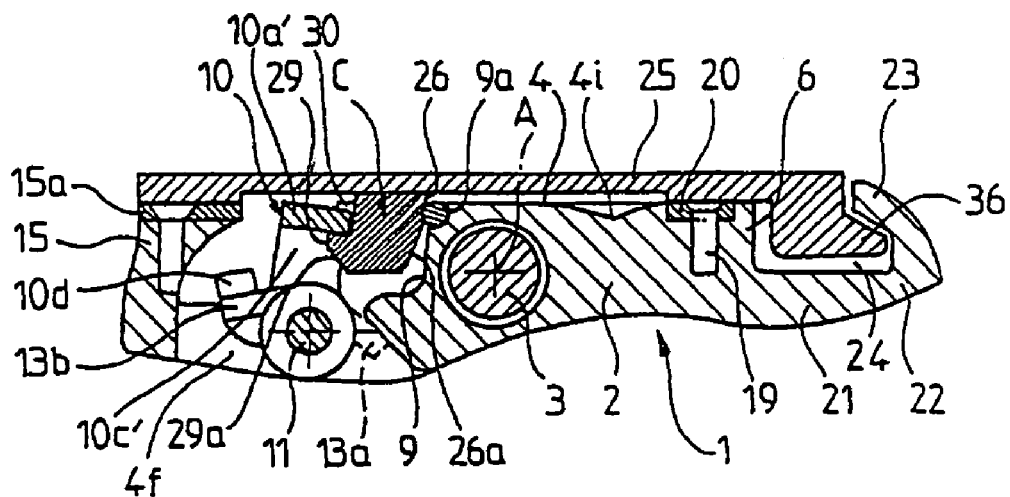

As an alternative, in FIG. 9, the frontal stop means is formed of a spring steel wire 9a, of circular section, set into the upper edge of the wall 9 in such a way that the wire 9a is flush with this wall. The abutment of the cleat C against the wire 9a takes place along a straight line contact parallel to the axis A. As is visible in FIG. 10, the wire 9a may have a return toward the rear on each side, to form a U flanking the cut-out 7.

A holding member 10 is mounted to move on the pedal body 4, to the rear of the wall 9.

According to the embodiment of FIGS. 1 to 6, the member 10 consists of a piece with a dihedral shape, the dihedral angle of which is parallel to the geometric axis A of the pedal. The front edge of the member 10, which is the front edge of the upper face 10a is parallel to the axis A and forms a forwardly projecting spur, with the same transverse breadth B as the cut-out 7. The face 10a in the rest position is roughly parallel to the upper plane of the plateau 4, at the level of or below this plateau. The other face 10b of the dihedron is inclined rearward. Each lateral end of the face 10b is secured to a forwardly projecting lug 10c orthogonal to the plane of the face 10b. Each lug 10c has a hole for the passage of a rod 11 constituting a spindle for the articulation of the piece 10. The rod 11 is engaged, at each end, in a hole 12 acting as a bearing, provided in a branch 4e, 4f extending the body 2 rearward. The space between the branches 4e, 4f is free of material. The holes 12 are provided lower down than the axis A relative to the plateau 4.

The holding member 10 is urged elastically to rotate forward by an elastic return means consisting of a torsion spring 13 engaged around the rod 11. One end 13a (FIG. 4) of the spring 13 bears against the pedal body 2 and the other end 13b bears against the member 10.

According to the alternative form of FIG. 9, the holding member 10 consists of a strip 10a' corresponding to the sole face 10a of the dihedron of FIGS. 1 to 6. The front edge of the member 10, which is the front edge of the strip 10a', is parallel to the axis A. The lateral ends of the strip 10a' are turned down at right angles downward to form the lugs 10c' for articulation on the rod 11. The end 13b of the spring 13 bears against a stop 10d secured to the member 10.

Figure 3:
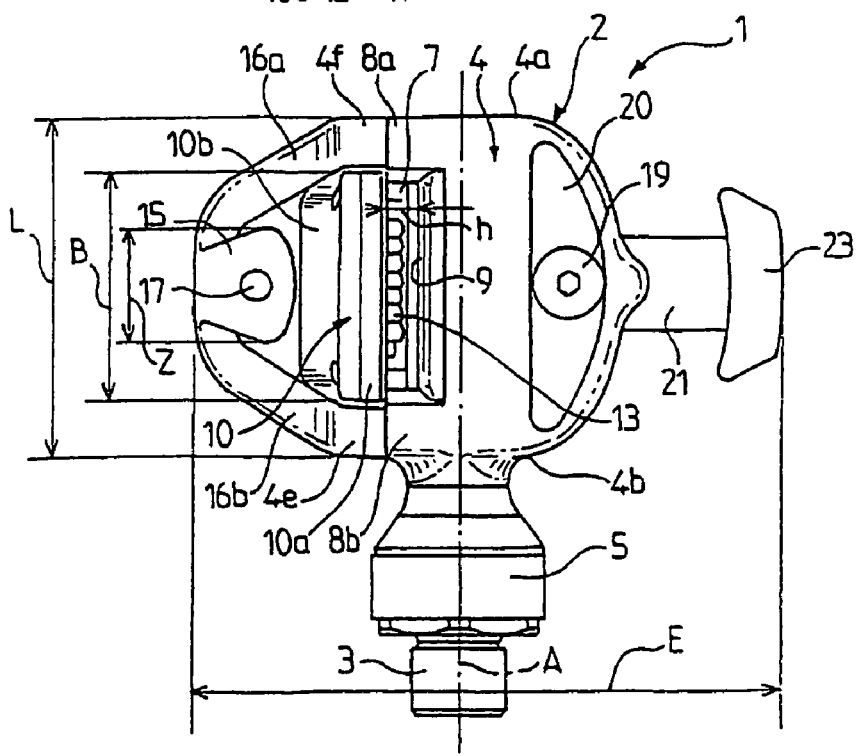
FIG. 3 is a plan view of this pedal.
Figure 4:
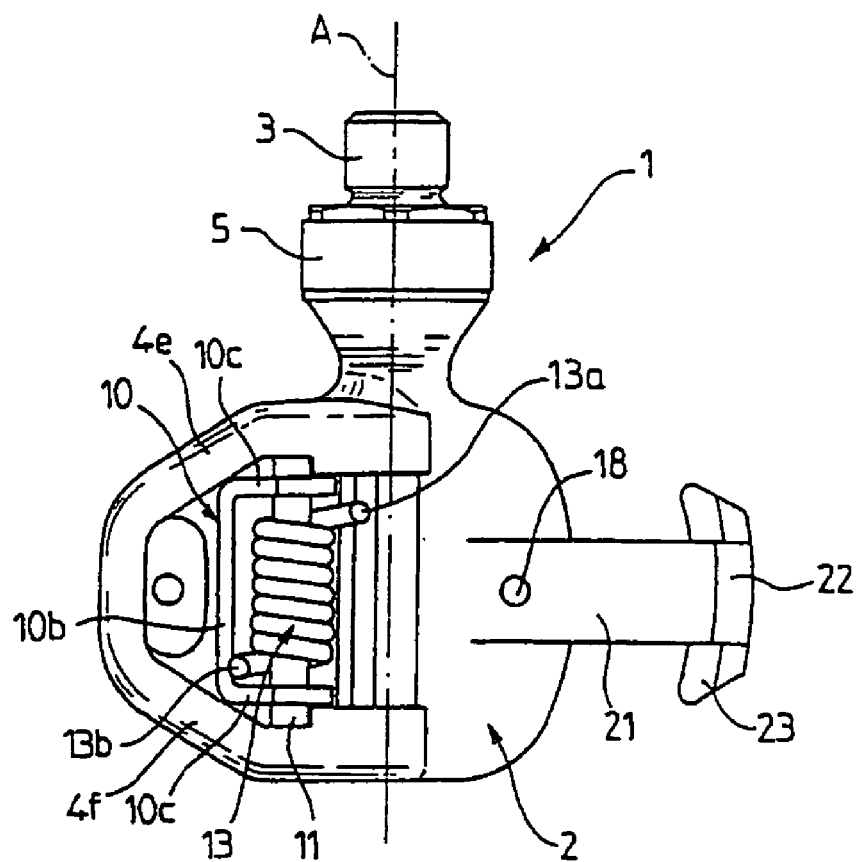
FIG. 4 is a view from beneath of the pedal of FIG. 1.
Figure 5:
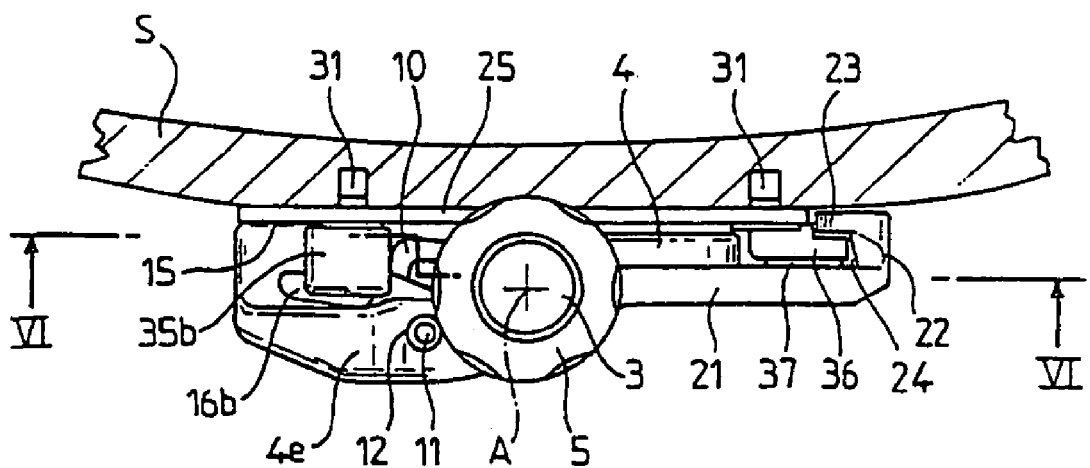
FIG. 5 shows, in a similar way to FIG. 2, the pedal, to which there is fixed a shoe, depicted schematically via part of its sole, equipped with the cleat.
Figure 6:
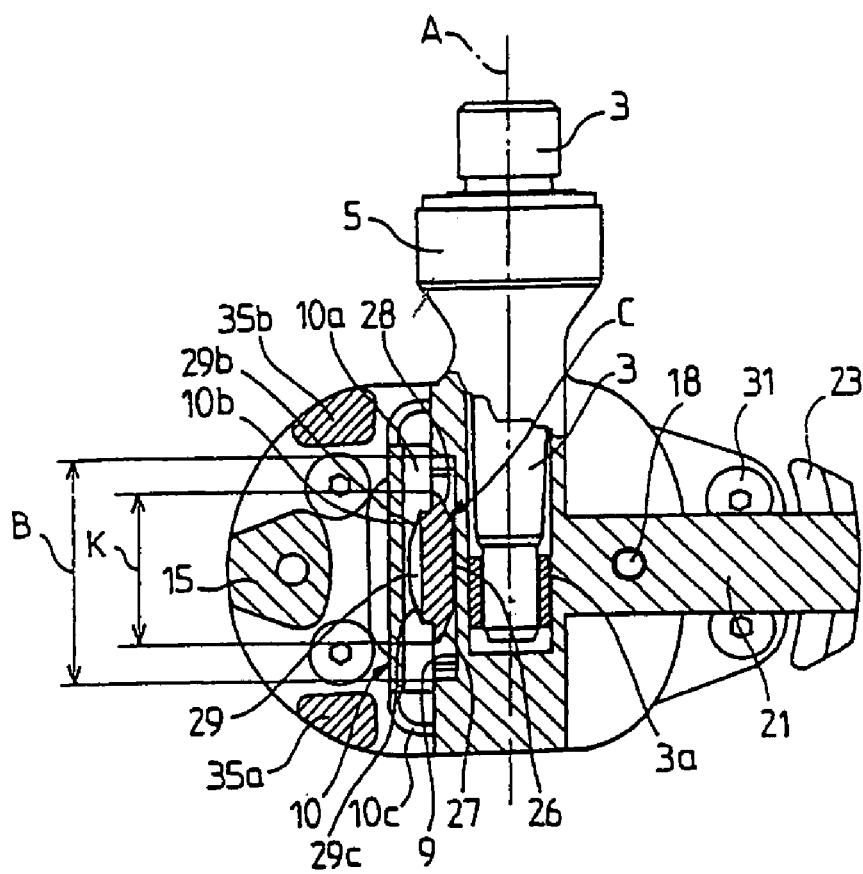
FIG. 6 is a section on VI—VI of FIG. 5, with part of an external view.

At rest, the member 10 occupies the position illustrated in FIG. 3 in which the front edge of the member 10 is a distance h from the wall 9. When sufficient force is exerted rearward on the member 10, its front edge can retreat so that the distance h increases. When the force ceases, the spring 13 returns the member 10 forward.

The distance h at rest is small by comparison with the longitudinal dimension E of the pedal. In particular, h is less than E/4 and preferably less than E/5.

The underside of the branches 4e, 4f is more or less level with the lowermost part of the pedal body 2. As these branches 4e, 4f have a height shorter than that of the body 2, particularly roughly equal to half this height, this means that there is a recess 14a, 14b on each side, to the rear of the plateau 4.

The member 10 is flanked by the start (perpendicular to the wall 9) of the branches 4e, 4f, which continue, converging toward the rear to a V, to meet, rising up to form a bearing region 15 situated level with the plateau 4. In the example of FIGS. 1 to 6, the bearing region 15 is formed by a kind of central block roughly in the shape of an isosceles trapezium with a convex long base situated at the front. The maximum width Z of the bearing region 15 is less than the width L of the pedal, preferably less than or equal to half the width L ($Z \leq L/2$).

On each side of the block 15 there are, in the pedal body, recesses 16a, 16b formed by empty spaces situated above the rear parts of the branches 4e, 4f.

The block 15 may be covered with a thin sheet 15a (FIG. 9) of a metal, particularly steel, harder than the material of the body 2 and more resistant to wear. The block 15 has a hole 17 for the attachment of this sheet, using a screw or a rivet for example. Likewise, there is a hole 18 in the front of the plateau 4, at the center, for attaching, for example using one or more screws 19 (FIG. 3), a thin sheet 20 roughly in the shape of a circular segment made of a metal harder than the material of the body 2, similar to the sheet 15*a*.

Figure 1:
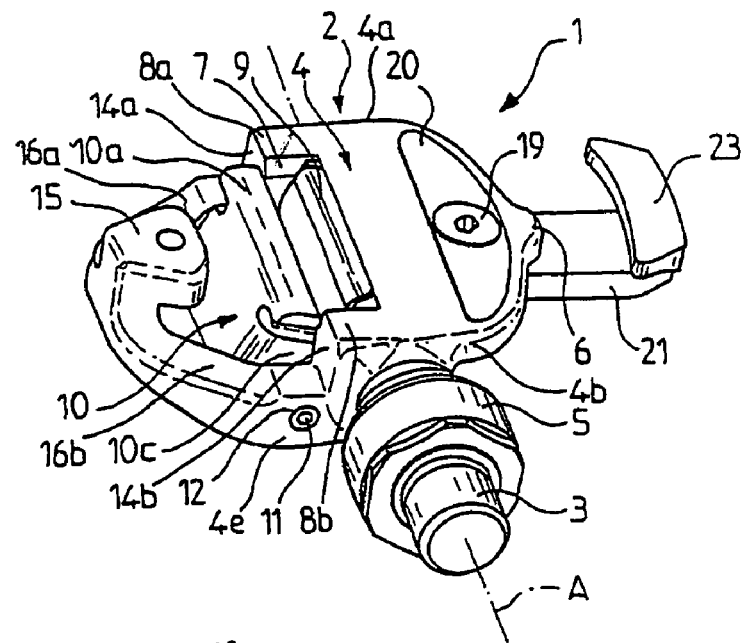
FIG. 1 is a perspective view of a bicycle left pedal according to the invention.
Figure 2:
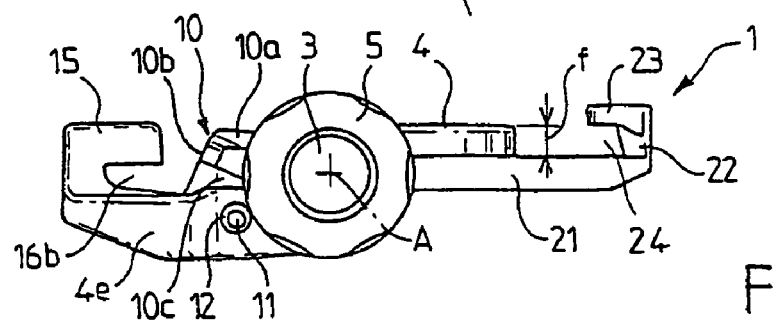
FIG. 2 is a side elevation of the pedal of FIG. 1.

The pedal body 2 is extended forward, at a level lower than the plateau 4, by a central blade 21 of a width smaller than the width L of the pedal. The distance between the upper face of the blade 21 and the upper plane of the plateau 4 is denoted f (FIG. 2). The blade 21 is equipped at its front end with an upwardly projecting rim 22 forming a return 23 toward the rear. The rear edge of the return 23 has a concave shape facing the rear. The space 24 between the blade 21 and the return 23 constitutes a housing to accommodate a stop member facilitating the positioning of the shoe on the pedal for clipping in.

Figure 8:
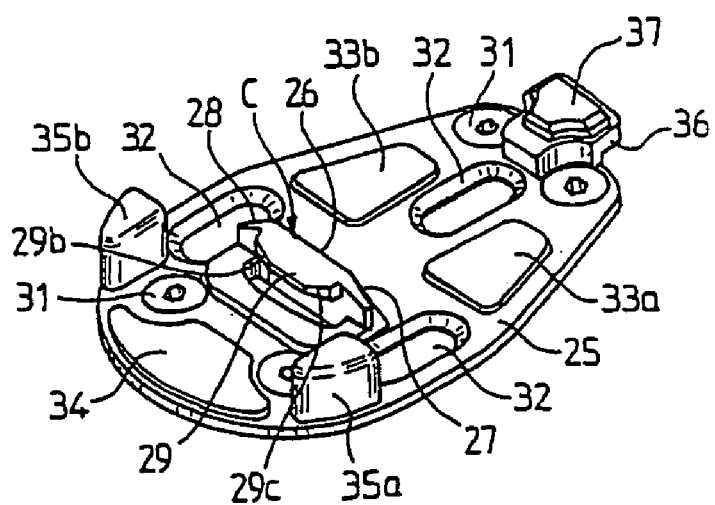
FIG. 8 is a perspective view from underneath of the mounting plate with the cleat.

The cleat C designed to be fixed under the sole S (FIG. 5) of a cycling shoe is clearly visible in FIGS. 7 and 8. The cleat C is secured to a mounting plate 25 and projects under the underside of this mounting plate, at right angles to the mounting plate. The cleat C is made of metal, particularly made of a cupro-aluminum alloy. The mounting plate 25 may consist of a sheet metal plate to which the cleat C is fixed, particularly by rivets or screws passing through holes t (FIGS. 10, 11) in the cleat C. The mounting plate 25 is designed to cover the pedal body, including the rear bearing region 15, and to extend up to near the return 23. The mounting plate 25 is rigid enough that it can, without appreciable flexing, transmit the thrust of the foot, exerted over the spindle 3, to the pedal. The mounting plate 25 bears against the pedal in front of the spindle 3, and at the rear bears on the block 15.

The cleat C has a frontal surface 26 (FIGS. 6 and 7) that is roughly flat, mating with the stop means 9 or 9*a* of the pedal. The surface 26 consists of a wall perpendicular to the mounting plate 28 and roughly parallel to the geometric axis A when clipping-in is performed. The wall 26 can slide against the frontal stop means 9, 9*a* without catching, in a direction perpendicular to the plateau 4. The wall 26 can also slide in a direction parallel to the axis A. The surface 26 is extended laterally by surfaces 27, 28 inclined rearward and forming an obtuse angle with the surface 26. The maximum dimension K (FIG. 6) of the cleat C, parallel to the axis A, is less than the dimension B of the cut-out 7 and of the wall 9. The difference between the values B and K is chosen to give the desired amplitude for lateral freedom of the cleat C and of the foot on the pedal.

The cleat C has, projecting rearward, a spur 29 able to catch under the front edge of the holding member 10 of the pedal. The spur 29 diverges downward away from the upper face of the cleat C to determine a groove 30 in which the front edge of the member 10 can be housed. The bottom of the groove 30 is parallel to the surface 26. The thickness n (FIG. 7) between the bottom of the groove 30 and the wall 26 is greater than the distance h on the pedal at rest. As a result, in the normal clipped-in position, the frontal surface 26 is in abutment against the wall 9 while the front edge of the member 10 is in abutment against the bottom of the groove 30.

The lower edge of the frontal wall 26 of the cleat C is formed of a chamfer 26*a* (FIG. 7) set back toward the rear facilitating engagement of the cleat C in the cut-out 7. The lower edge of the hook 26 is formed of a chamfer 29*a* inclined forward encouraging the retreat of the front edge of the member 10 during clipping-in.

The lateral edges 29*b*, 29*c* of the spur are inclined with respect to the face 26 in the opposite direction to the walls 27, 28. The choice of the angle inclination of the edges 29*b*, 29*c* determines the angle of twist that brings about unclipping or "release".

The mounting plate 25 is equipped with screws or rivets, for example four screws 31 (FIG. 8), two at the front, two at the rear, for fixing under the sole S of the shoe. Other types of fixing are possible, for which three oblong holes 32 arranged in a triangle in the mounting plate 25 are provided. An overmolding of plastic in the mounting plate 25 is provided with additional thicknesses 33*a*, 33*b* (FIG. 8) on the sides, toward the front of the mounting plate 25, while a central additional thickness 34 is provided at the rear. These additional thicknesses 33, 34 allow the mounting plate 25 to bear firmly against the plate 20 of the plateau 4 and against the rear block 15 over which the additional thickness 34 is positioned.

At the rear, near each of its edges, the mounting plate 25 is equipped with a crampon 35*a*, 35*b*, roughly in the shape of a triangular prism the generatrices of which are perpendicular to the mounting plate 25. The crampons 35*a*, 35*b* are preferably removable so that they can be changed. The crampons 35*a*, 35*b* are made of plastic or elastomeric material; they project under the underside of the mounting plate 25 over a distance m (FIG. 7) greater than the projection q of the cleat C under the mounting plate 25.

The crampons 35*a*, 35*b* are arranged in such a way as to pass through the corresponding recess 16*a* or 16*b* as the mounting plate 25 is twisted in order to bring about release.

The mounting plate 25 is equipped, under its front end, with a stop member 36 projecting forward and underneath the mounting plate to engage under the return 23 of the pedal. The underside of the stop member 36 is equipped with a coating 37 of plastic or elastomeric material. The projection of the stop 36 with the coating 37 under the plate 25 is such that a plane P (FIG. 7) resting against the rear crampons 35*a*, 35*b* and the member 36 remains distant from the lower edge of the cleat C. Under these conditions, a cyclist wearing a shoe equipped with a cleat C with a mounting plate 25 has, as he walks, three point contact corresponding to the two rear crampons 35*a*, 35*b* and the front member 36, 37; he can thus roll his foot without the cleat C coming into contact with the ground.

FIG. 9 shows an alternative essentially already described. Elements which play similar parts to elements in FIGS. 1 to 6 are denoted by the same references. It can be seen that the plateau 4 has, forward of the spindle 3, a depression 4*i* reducing the thickness of the body and the mass of the pedal.

The pedal body with its plateau 4, its rear branches 4*e*, 4*f*, its block 15 and its blade 21 is preferably made as one piece, particularly in light alloy or in thermoplastic resin.

That being the case, the use and operation of the bicycle pedal and clip-in cleat assembly are as follows.

Consider a cyclist wearing a shoe the sole S (FIG. 5) of which is fitted with the mounting plate 25 with cleat C.

To "engage", that is to say to clip his shoe into the pedal 1, the cyclist offers the sole S over the pedal, with the tip of the foot inclined forward, so as to engage the stop member 36 under the return 23. The cleat C is then more or less over the cut-out 7.

The cyclist presses down on the pedal with his foot and this causes the cleat C to enter the cut-out 7, which entry is facilitated by the presence of the chamfer 26*a*. Engagement of the cleat C in the cut-out 7 occurs with practically no retreat perceivable to the cyclist. The forward stopping of the cleat C is provided by the collaboration between the frontal face 26 of this cleat and the frontal stop means 9 or 9a of the pedal. The member 36 is not in contact with the rim 22.

As the cleat C drops down into the cut-out 7, the rear chamfer 29a pushes the holding member 10 back until the front edge of the member 10 has negotiated the upper edge of the spur 29 and enters the groove 30. The member 10, urged by the spring 13, returns forward and its front edge is pressed against the bottom of the groove 30. The crampons 35a, 35b sit in the recesses 16a, 16b, or in the vicinity thereof.

The rear part of the mounting frame 25 is in contact with the rear bearing region 15, 15a. The front part of the mounting plate 25 bears against the plate 20 held by the screw or screws 19.

The shoe is clipped into the pedal under optimum conditions. Specifically, the cleat C is housed in the recess 7 at a level below that of the plateau 4, so that the sole S presses on the plateau 4 a small distance away from the geometric axis A of the pedal, thus giving good pedaling conditions.

Furthermore, the cyclist enjoys angular freedom and lateral freedom to position his foot on the pedal.

The possible retreat of the cleat C and of the shoe, against the force exerted by the spring 13 on the member 10, is limited by the rear of the member 36 coming to bear against the projection 6, without there being any unclipping.

FIG. 10 schematically and partially depicts, in plan view, the "engaged" position. The cleat C is clipped into a right pedal, that is to say that the pedal crank (not depicted) to which the pedal would be fixed, would be to the left of the cleat C in FIGS. 10 and 11.

Unclipping or "release" is obtained by a twisting of the foot which causes the mounting plate 25 and the cleat C to turn relative to the pedal 1. In general, this twisting movement is performed by shifting the heel of the foot outward, but a twisting movement in the opposite direction may also bring about unclipping.

The diagram of FIG. 11 illustrates unclipping. The outward twisting movement of the foot has caused the cleat C to turn. The center of rotation of the cleat and of the shoe is situated against the frontal stop means 9a or 9, to the rear of the geometric axis A of the pedal. The upper part of the cleat clamped between the frontal stop means 9a or 9 and the parallel front edge of the member 10 acts as a cam with a more or less rectangular contour, the large dimension of which is parallel to the axis A. The rotation of C causes the holding member 10 to retreat up to the unclipping angle for which the rear edge 29b escapes from the front edge of the holding member 10. The shoe is then free of the pedal.

During this rotation, the crampons 35a, 35b cross the corresponding recess 16a, 16b.

When the shoe is clipped in and the cyclist exerts a pulling force on the pedal, the rear bearing region 15, 15a, in contact with the mounting plate 25, prevents any relative rotation of the pedal likely to cause unclipping.

The cyclist can walk resting on the ground via the crampons 35a, 35b and the front member 36, 37, without the cleat C touching the ground.

The invention claimed is:

1. An assembly of a bicycle pedal with a safety binding and a cleat, the pedal comprising a pedal body mounted to rotate on a spindle having a geometric axis and, on at least one face of the body:

a plateau above the spindle of the pedal;

a frontal stop means;

a holding means mounted to move on the pedal, and arranged to be applied by an elastic return means against the rear of the cleat, and an upward retaining means provided on the pedal to collaborate with a mating means on the cleat, wherein the cleat is clipped into the pedal by foot pressure on the plateau of the pedal, while unclipping is may be accomplished by twisting the foot relative to the pedal, wherein:

the pedal body comprises, behind said geometric axis, and behind the plateau, recesses on two sides of the pedal body, the cleat is secured to a mounting plate, said mounting plate being equipped toward the rear, on two sides of the mounting plate, with crampons, and each of said crampons is arranged to pass through a corresponding one of said recesses during a twisting movement for release.

2. The assembly as claimed in claim 1, wherein the crampons are made of plastic or elastomeric material.

3. The assembly as claimed in claim 1, wherein the pedal body comprises, behind the plateau, extending branches on said two sides of the pedal body, said recesses being situated above said extending branches.

4. The assembly as claimed in claim 3, wherein each of said extending branches has a height shorter than a height of the pedal body, wherein each of said extending branches have an underside that is roughly level with a lowermost part of the pedal body, and wherein said extending branches converge toward a rear of the pedal to meet and form a rear bearing region.

5. The assembly as claimed in claim 1, wherein the mounting plate is fixed to the cleat so as to cover substantially the entire pedal.

6. The assembly as claimed in claim 5, wherein a stop member, which projects downward and forward, is fixed under the mounting plate, at a front of the mounting plate.

7. The assembly as claimed in claim 6, wherein the stop member comprises, under its underside, a coating of plastic or elastomeric material.

8. The assembly as claimed in claim 6, wherein said crampons and said stop member are tall enough to form three point contact on the ground and keep the cleat out of contact with the ground when a cyclist is walking in a shoe equipped with the cleat and mounting plate.

* * * * *